(12) United States Patent
O'Toole et al.

(10) Patent No.: US 8,479,481 B2
(45) Date of Patent: Jul. 9, 2013

(54) AQUATIC PLANT HARVESTER

(75) Inventors: Christopher Brian O'Toole, Winmalee (AU); Gary Charles Lane, Lidcombe (AU)

(73) Assignee: Freshwater Environmental Management Pty Ltd, Lidcombe (AU)

( * ) Notice: Subject to any disclaimer, the term of this patent is extended or adjusted under 35 U.S.C. 154(b) by 2152 days.

(21) Appl. No.: 10/474,692

(22) PCT Filed: Aug. 21, 2003

(86) PCT No.: PCT/AU03/01070
§ 371 (c)(1),
(2), (4) Date: Sep. 2, 2004

(87) PCT Pub. No.: WO2004/017715
PCT Pub. Date: Mar. 4, 2004

(65) Prior Publication Data
US 2005/0044837 A1    Mar. 3, 2005

(30) Foreign Application Priority Data

Aug. 26, 2002 (AU) .............................. 2002953633
Apr. 3, 2003 (AU) .............................. 2003901606

(51) Int. Cl.
*A01D 44/00* (2006.01)
(52) U.S. Cl.
USPC ............................................................. 56/8
(58) Field of Classification Search
USPC ........................................................ 56/8, 9
See application file for complete search history.

(56) References Cited

U.S. PATENT DOCUMENTS

| 2,629,218 | A |   | 2/1953  | Smith et al. ............... 56/9 |
| 2,907,162 | A |   | 10/1959 | Rebikoff ................... 56/9 |
| 3,449,892 | A |   | 6/1969  | Huff ......................... 56/9 |
| 3,477,213 | A |   | 11/1969 | Just et al. ................. 56/9 |
| 3,521,387 | A | * | 7/1970  | Degelman ............... 37/310 |
| 3,596,444 | A |   | 8/1971  | Beattie |
| 3,599,354 | A | * | 8/1971  | Larson .................... 37/344 |
| 3,707,070 | A |   | 12/1972 | Chaplin |
| 3,738,029 | A | * | 6/1973  | Harmon ................... 37/329 |
| 3,808,779 | A | * | 5/1974  | Randall .................... 56/9 |
| 3,866,396 | A |   | 2/1975  | Meyer ...................... 56/9 |
| 3,878,669 | A |   | 4/1975  | Chaplin .................... 56/9 |

(Continued)

FOREIGN PATENT DOCUMENTS

| CA | 1076369 | 4/1980 |
| DE | 1634133 | 6/1970 |

(Continued)

OTHER PUBLICATIONS

Supplementary European Search Report, corresponding EP Application No. EP 03 79 2036, mailed Jan. 16, 2013.

*Primary Examiner* — Alicia Torres
(74) *Attorney, Agent, or Firm* — Steptoe & Johnson LLP

(57) ABSTRACT

An aquatic harvester for use with an aquatic craft, the aquatic craft including sides, a bow and a stern, the aquatic harvester including a frame which includes one or more arms, the or each arm having a forward end portion and the or each arm being pivotally connected to the aquatic craft at a position spaced from the forward end, said forward end of the or each arm being adapted for connection with an implement, the apparatus further including means for controlling the pivotal position of the or each arm relative to the aquatic craft.

23 Claims, 13 Drawing Sheets

U.S. PATENT DOCUMENTS

| | | | | |
|---|---|---|---|---|
| 3,934,392 A | * | 1/1976 | Moery et al. | 56/202 |
| 3,962,803 A | | 6/1976 | O'Brien | 37/66 |
| 4,095,545 A | * | 6/1978 | Vaughn et al. | 114/26 |
| 4,205,507 A | | 6/1980 | McClure | 56/8 |
| 4,222,217 A | | 9/1980 | Brown | 56/9 |
| 4,258,534 A | | 3/1981 | Bryant | 56/9 |
| 4,261,160 A | * | 4/1981 | Niewiera | 56/8 |
| 5,201,168 A | | 4/1993 | Jenson | 56/8 |
| 5,372,001 A | | 12/1994 | Olson et al. | 56/8 |
| 5,481,856 A | | 1/1996 | Wickoren et al. | 56/9 |
| 5,603,204 A | | 2/1997 | Harvey-Rioux et al. | 56/9 |
| 6,023,920 A | | 2/2000 | Penny et al. | 56/8 |
| 6,116,004 A | | 9/2000 | Penny et al. | |
| 6,357,213 B1 | | 3/2002 | Dillingham | 56/8 |

FOREIGN PATENT DOCUMENTS

| | | |
|---|---|---|
| FR | 2575360 | 7/1986 |
| FR | 2643215 | 8/1990 |
| FR | 2644973 | 10/1990 |
| FR | 2680945 | 3/1993 |
| GB | 2230506 | 10/1990 |
| JP | 56-18530 | 2/1981 |
| JP | 61-266741 | 11/1986 |
| JP | 64-38973 | 3/1989 |
| JP | 10095393 | 4/1998 |
| JP | 3049549 | 3/2000 |
| SE | 501536 | 3/1995 |

* cited by examiner

AQUATIC PLANT HARVESTER

This application claims priority under 35 USC 365(c) to International Application No. PCT/AU2003/01070, filed on Aug. 21, 2003, which claims priority to AU Patent Application No. 2002953633, filed on Aug. 26, 2002 and AU Patent Application No. 2003901606, filed Apr. 3, 2003, each of which is incorporated by reference in its entirety.

BACKGROUND TO THE INVENTION

1. Field of the Invention

The present invention relates to aquatic plant harvesters, and in particular but not solely to weed harvesters for use in preparation and maintenance of lake and waterway shallow marine sporting facilities. The invention may also be useful in commercial aquatic plant harvesting, marine and fresh water.

2. Summary of the Prior Art

Preparation and maintenance of lake and waterway sports facility includes the requirement to harvest and remove submerged and floating aquatic plants. The governing rules of certain sporting bodies require complete clearance to specified minimum depths. For example the International Rowing Body FISA requires a clear water zone to a depth of 3 metres below the hull of the racing craft.

Plants requiring control in Australian facilities include but are not limited to: *Potamogeton ochreatus, P. tricarinatus, P. perfoliatus, P. crispus, Myriophyllum verrucosum, Hydrilla verticillata, Vallisneria americana, Egeria densa, Water Milfoil, Canadian Pondweed, Salvinia* and *Typha*.

There are several existing barge or punt mounted marine harvesters intended for use in this area. These include the Aqua-Equip harvester manufactured by the Attosar Corporation of Oatville Ontario Canada. This machine includes a barge with an angled conveyor extending into the water from its leading edge. The angled conveyor is formed of an open chain grid. A cutting head is provided at the lower submerged end of the angled conveyor to cut marine weed. The weed is intended to float onto the conveyor and be conveyed up to a catchment trough. Entrained water spills through the open grid of the conveyor as it is carried from the water. Similar arrangements are also used in the other vessels that the applicants are aware of.

Experience has shown that these arrangements provide inefficient collection of the cut weed leaving large quantities of floating vegetative material. Also, with many exotic weeds the weeds will propagate from severed nodes. The severed nodes are relatively small and prone to falling through the open conveyor grids. These disadvantages have generally required the use of additional surface clean up vessels. These clean up vessels may operate during and after harvesting, pulling or pushing a scoop net through the surface region to remove remaining vegetable material.

Another difficulty is that these harvesters create a significant bow pressure wave when moving forward at reasonable speeds. The inventors believe this is due to the large frontal area defined by the conveyor. Pressure waves can cause redistribution of plant material leading to large amounts left uncut. This reduces the effective operating speed of the harvester.

SUMMARY OF THE INVENTION

It is an object of the present invention to provide an aquatic plant harvester and/or an aquatic surface strainer and/or an aquatic environment bank mower which at least goes some way towards overcoming the above disadvantages or which will at least provide the industry with a useful choice.

According to one aspect of the present invention there is provided an aquatic harvester for use with an aquatic craft, the aquatic craft including sides, a bow and a stern, the aquatic harvester including a frame which includes one or more arms, the or each arm having a forward end portion and the or each arm being pivotally connected to the aquatic craft at a position spaced from the forward end, said forward end of the or each arm being adapted for connection with an implement, the apparatus further including means for controlling the pivotal position of the or each arm relative to the aquatic craft.

According to another aspect of the present invention there is provided an implement for use in a harvester, the implement including a collecting hood, with a mouth opening for receiving harvested material and an outlet opening, the collecting hood being operatively connectible to a suction pump through a conduit connecting between an inlet to said suction pump and said outlet opening of said collecting hood.

According to another aspect of the present invention there is provided an aquatic plant harvester including: a vessel having a bow and a stern, and a frame having a pair of arms, each arm having forward and rearward ends, said rearward ends of said arms being pivotally connected with either side of said vessel at a point amidships of said bow and said stern and said forward ends of said arms extending beyond the bow of said vessel, with said arms pivoted to an approximately horizontal condition, and at least one transverse connection between said arms, forward of said bow of said vessel with said arms in said horizontal condition, said forward ends of said arms being adapted for connection with an implement, and means for controlling the pivotal position of said arms relative to said vessel.

The harvester may further include a suction pump and drive therefor mounted on said vessel, an implement connected with said forward end of said frame, said implement include a collecting hood, with a mouth opening for receiving aquatic debris and an outlet opening, and a conduit connecting between the inlet of said suction pump and said outlet opening of said collecting hood.

The harvester may further include a strainer assembly on said vessel for receiving a flow of water with entrained plant debris, releasing said water and retaining said plant debris, and a conduit extending from the outlet of said pump to said strainer. In one preferred form the strainer assembly includes a straining bag having at least a collapsed form and an open form, and means to support said straining bag in said open form below the outlet of said conduit from a said pump outlet.

The means to support said straining bag may include a sloping platform at an elevation above at least a part of the side of said boat, said platform sloping towards said side of said vessel and extending over said side of said vessel, said platform being enclosed around its perimeter, other than to water flow over said side of said vessel, and said bag is supported on said platform. Preferably, the bag includes closure means for closing the opening of said bag, and said means to support the straining bag allows release of the closed bag off said vessel.

In one form the collecting hood includes a chopper at or adjacent said outlet port for chopping plant debris received into said collecting hood into smaller portions. The implement may further include a cutting head, extending across a bottom edge of said hood over the full width of said hood.

At least one float attached to said forward end of said frame, said float supporting said forward end of said frame at or adjacent the water surface for allowing surface skimming by said collecting hood.

In another form of the invention the harvester may include an implement connected with said forward end of said frame, said implement including a cutting head extending between said arms of said frame.

An electronic navigation system may be provided which includes a positioning system for monitoring the position of said vessel, means to accumulate said position of said vessel as a plottable path representable on a display at a certain scale, the width of said path at said certain scale approximating the width of said vessel, and a display for displaying said path.

According to another aspect of the present invention there is provided an aquatic harvester including: a vessel having a bow and a stern a suction pump and drive therefor, mounted on said vessel, an implement including a collecting hood with a mouth opening for receiving aquatic borne plant debris and an outlet opening, a conduit connecting between the inlet of said suction pump and said outlet of said collecting hood, and a connection arrangement between said implement and said vessel which supports said implement outboard of said vessel at a selected depth.

There may be further provided a strainer assembly which may be of the type described earlier.

In addition, the harvester may include a collecting hood of the type described earlier.

In one form the cutting head may include a first bar including a set of parallel and forwardly extending guide prongs, and a second bar reciprocable relative to said first bar and carrying a set of forwardly extending spaced apart knives, said spacing of said knives corresponding with said spacing of said guide prongs, reciprocation of said second bar reciprocating said knives to cut material between said knives and said guide prongs, said guide prongs extending at least 50 millimetres forward of said first bar.

A float may be provided of the type described herein.

According to yet another aspect of the present invention there is provided an aquatic plant harvester including: a vessel having a bow in the stern, an implement including a cutting head extending between said arms of said frame, and a connection arrangement between said implement and said vessel which supports said implement outboard of said vessel at a selected depth.

According to yet another aspect of the present invention there is provided an aquatic plant harvester including: a vessel having a bow in the stern, an electronic navigation system including a positioning system for monitoring the position of said vessel, means to accumulate said position of said vessel as a plottable path representable on a display at a certain scale, the width of said path at said certain scale approximating the width of said vessel, and a display for displaying said path, a working implement for collecting aquatic plant material, and a connection arrangement between said implement and said vessel which 10 supports said implement outboard of said vessel at a selected depth.

Preferably, the navigation system includes a processing unit and a memory unit, said processing unit executing programs stored in said memory unit, and said stored programs include means for allowing storage of geographical information concerning a local aquatic environment in said memory unit, said information including vegetation specific information such as the location of plant assemblages.

There may further be provided means for providing an output indicative of the working depth of said implement, said output provided as an input to said navigation system, and said programs include program means for updating said vegetation specific information based on the work progression of said vessel and the working depth of said implement.

According to yet another aspect of the present invention there is provided an aquatic harvester including a vessel, the harvester including one or more arms the or each arm having a working end portion to which an implement is adapted to be operatively connected, the or each arm being operatively connected to the vessel at a pivot mounting spaced from the working end portion so that the working head can be moved to selected depth.

In one form the vessel has a bow and a stern, the pivot mounting being disposed in the region of the stern of the vessel. Preferably, the pivot mounting is disposed at an end portion of the or each arm remote from the working end portion. Preferably, the or each arm is movable between a position in which is generally horizontal to an inclined or vertical position. Preferably, the implement when attached to the or each arm extends forwardly of the bow of the vessel.

According to one form of the invention a single arm is provided. Preferably, the arm is disposed generally centrally of the underside of the vessel and extends in a direction between the stern and the bow. Preferably, the harvester further includes a suction pump mounted on the vessel and one or more conduits extending between the suction pump and the work end portion of the arm, the or each conduit extending along the arm.

The harvester may further include a strainer assembly on vessel for receiving a flow of water with entrained plant debris, releasing the water and retaining the plant debris, and a conduit extending from the outlet of the pump to the strainer. The strainer assembly may be in the form described earlier. The implement may also be of any of the types described earlier.

The harvester further includes transfer apparatus for transferring filled bags (which may define the strainer) from the vessel, the transfer apparatus including a rail disposed above the strainer assembly and extending therefrom, and a carriage operatively mounted to the rail for movement therealong and means for connecting the strainer to the carriage. The rail may include a section where the strainer or bag is connected to the carriage and a holding section which receives the carriage for subsequent disposal.

According to yet another aspect of the present invention there is provided a work head for use with an aquatic harvester, the work head including a collecting hood with a mouth opening and an outlet opening said hood being separated into two zones, each having an outlet opening operatively communicating with a respective conduit.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Preferred embodiments of the invention will be hereinbefore described with reference to the accompanying drawings, and in those drawings.

DETAILED DESCRIPTION

Figure 1:
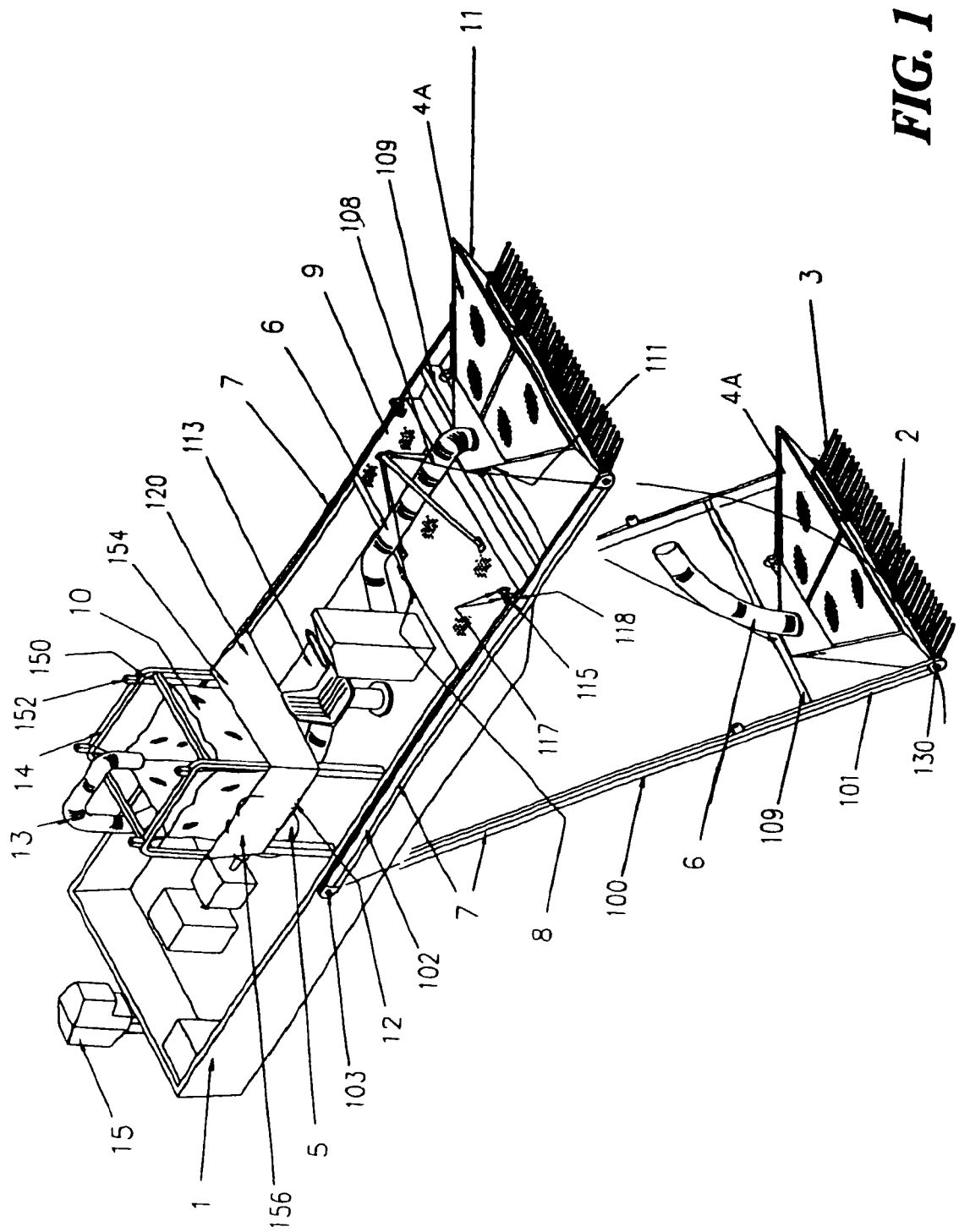
FIG. 1 is a perspective view of a harvester according to the preferred embodiment of the present invention. The harvesting head is shown in a cutting configuration and in each of a stowed and harvesting condition.
Figure 2:
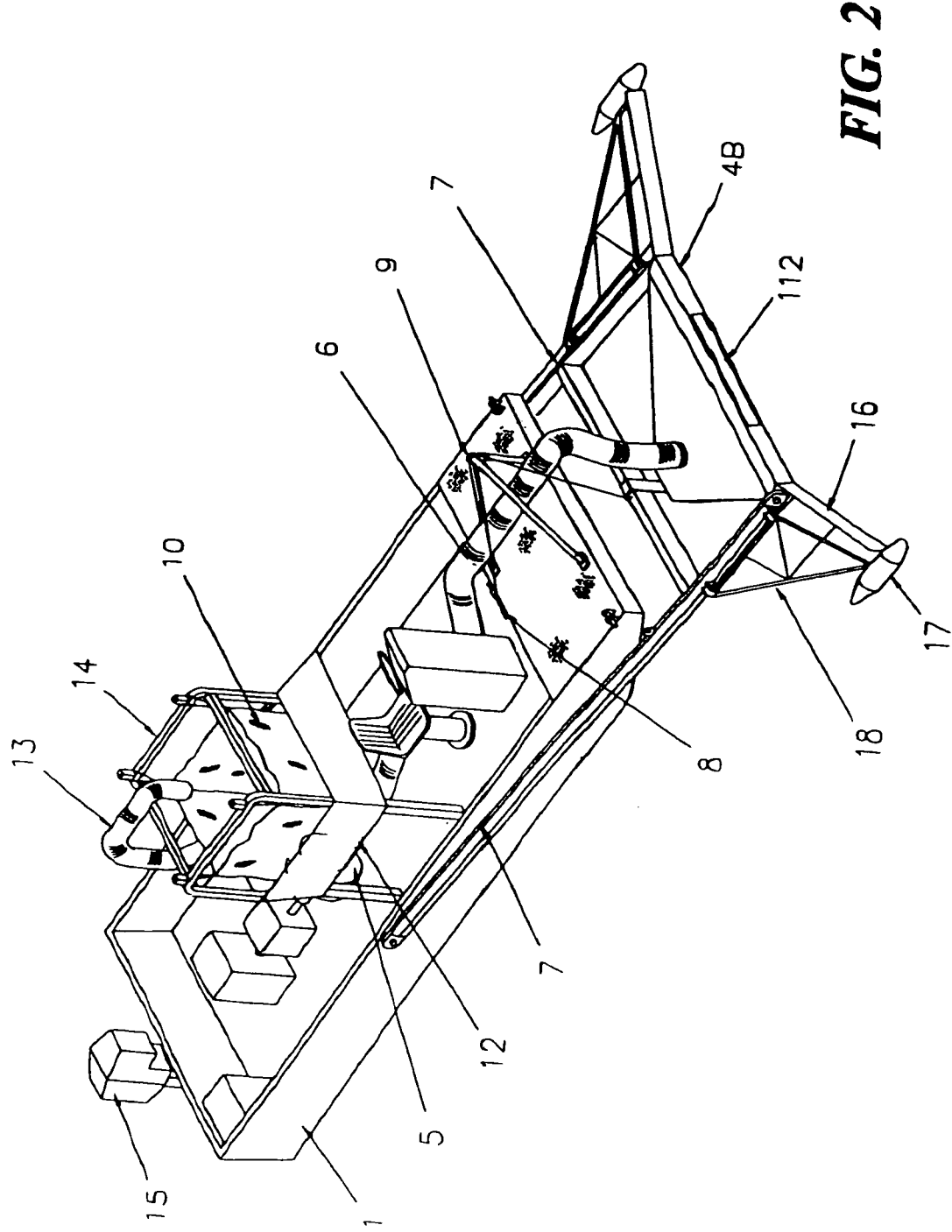
FIG. 2 is a perspective view of a harvester according to the preferred embodiment of the present invention, with the harvesting head shown in a surface skimming configuration and condition.
Figure 6:
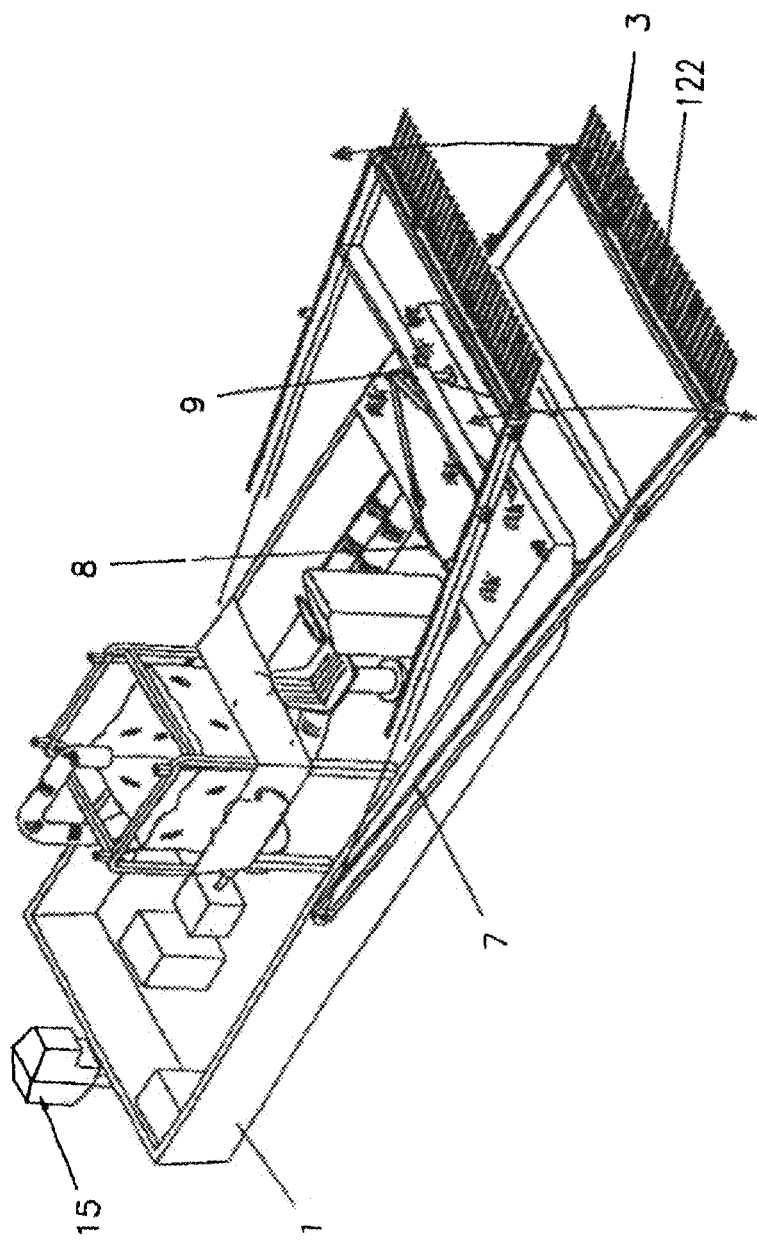
FIG. 6 is a perspective view of a harvester with suction hood removed for bank clearance work.
Figure 7:
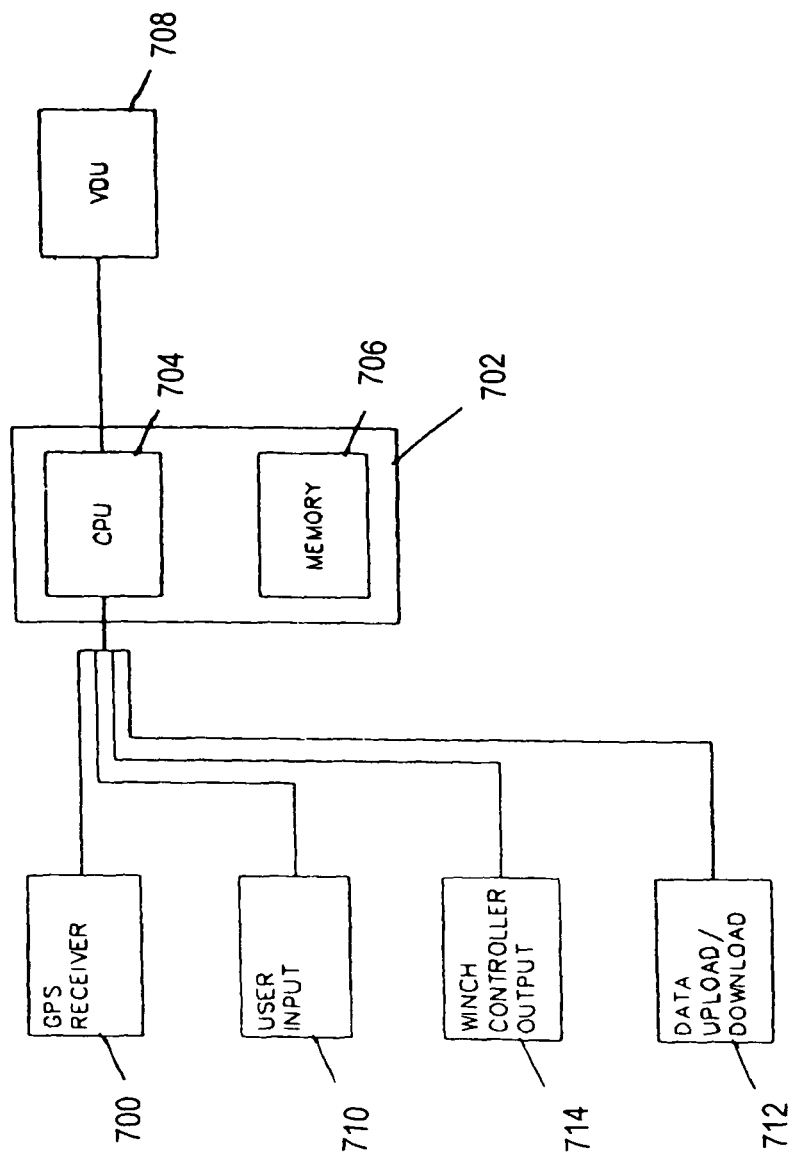
FIG. 7 is a block diagram of a GPS navigation system according to another aspect of the invention.

Referring to FIGS. 1, 2 and 6, in one aspect the present invention is a vessel for multipurpose aquatic work which has a working head which is reconfigurable between several operating configurations.

The vessel preferably takes the form of a flat bottomed punt 1. A frame 100 is pivotally mounted from the punt 1. The frame 100 has a forward end 101 configured to receive one of several implements for performing maintenance work. The frame 100 his a rearward end 102 which has a pivotal connection 103 with the side walls of the punt 1. The location of pivotal connections 103 is preferably approximately at midships along the side walls of the punt 1. The arms 7 of the frame 100 are sufficiently long that the forward end 101 is clear of the bow of punt 1 with the frame 100 lifted into a horizontal or near horizontal position. Each arm 7 is preferably at least 5 metres long and protrudes at least 1.4 metres beyond the bow when in the horizontal condition.

Apparatus is provided for raising and lowering the frame 100 relative to the bow of punt 1. This apparatus may take any suitable form, for example hydraulic, pneumatic or electrical linear actuators between arms 7 and the punt 1 could be used. However the preferred form of raising and lowering mechanisms includes a winch 8 operating over an elevated gantry 9 to let out and bring in a cable 108 which is connected with the frame 100. The frame 100 includes a cross member 109 extending between the arms 7 and defining the rear extent of forward end 101. The cross member 109 includes attachment point 111 for cable 108. The cross member 109 also serves to support the rearward end of at least one of the attached implements.

The winch 8 is preferably electrically operated from user control at the steering station. Preferably the user control includes a depth readout corresponding with the operating depth of the, cutter head (which is a linear function of the wire or cable paid out).

The punt 1 is preferably self-propelled. In the preferred form the punt 1 includes a powered propeller drive such as an outboard motor 15, controllable from a steering position 113 located just forward of midships. For general use in recreational and sporting facilities a 6 metre flat bottomed punt powered by a 60 horsepower outboard motor is thought to be suitable. Other self drive systems such as jet propulsion, paddle wheels or mechanical, or hydraulically driven propellers may also be used. Constrained drive systems such as cable traversing may also be appropriate in some situations.

Figure 5:
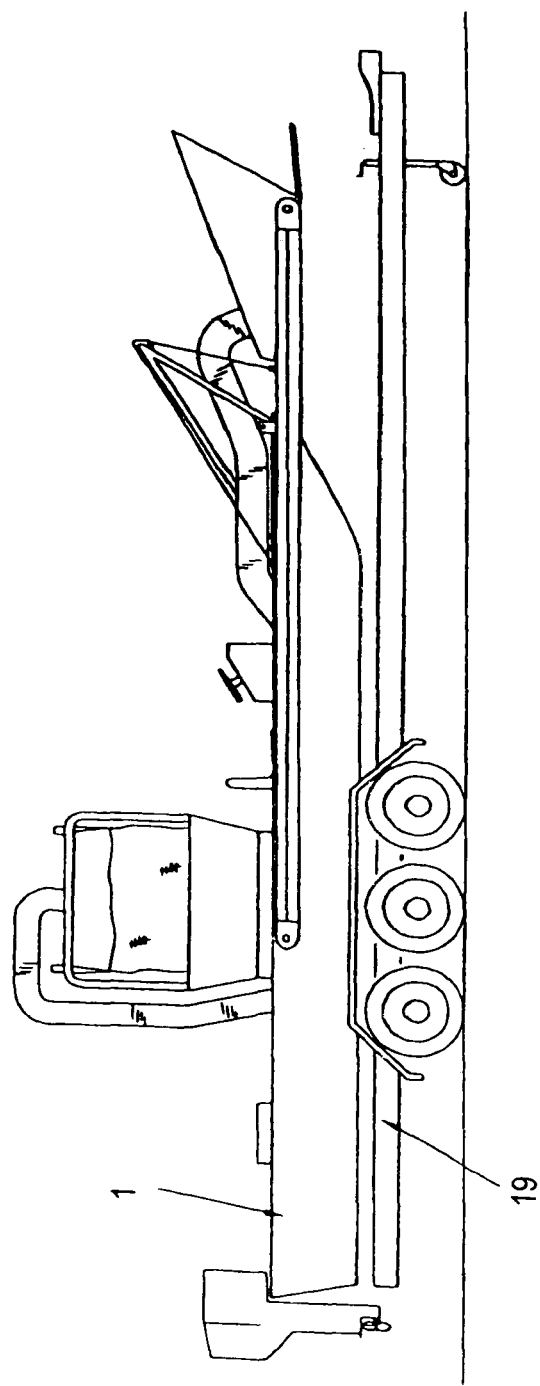
FIG. 5 is a side elevation of the harvesting unit arranged for transport on a transport trailer.

Referring to FIG. 5 the vessel and its various implements may be transported between work environments on a transport trailer 19. For a vessel of the size described herein the transport trailer may for example be a 9-metre multiple axle trailer with auxiliary braking. A retainer is preferably provided between the frame 100 and the punt 1 to hold the frame 100 in a horizontal position during transport. For example the retainer can be seen as pins 115 passing through aligned apertures in a series of lugs 117, 118. For each retainer a pair lugs 117 are located on the foredeck of the punt 1 and a single lug 118 is located on the corresponding arm 7 of frame 100. The lugs are in positions to become aligned with the lugs 117 with the frame 100 raised.

In further aspects the present invention lies in each of the operating configurations of the vessel.

Figure 3:
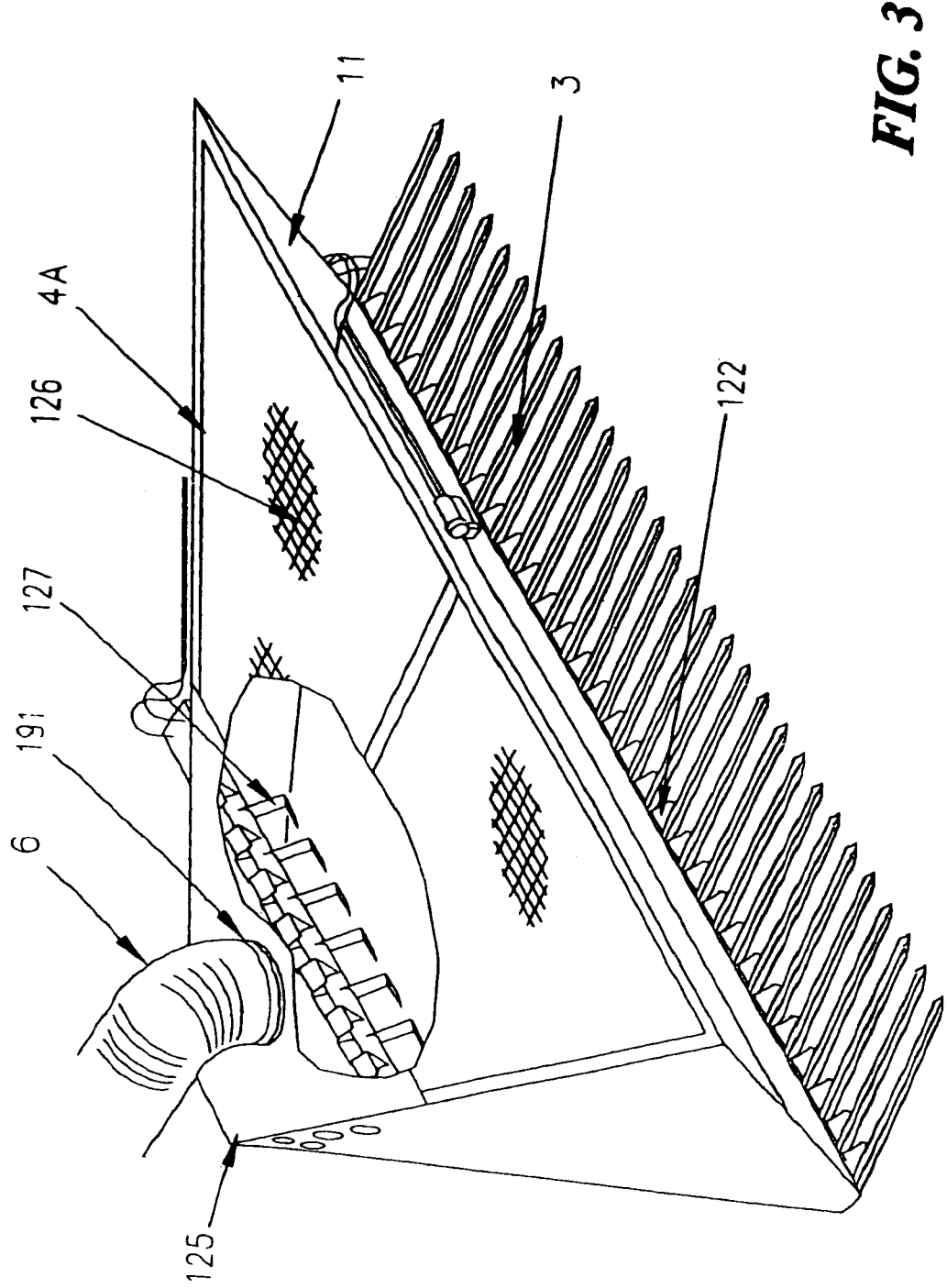
FIG. 3 is a perspective view of the cutting head in use in FIG. 1, with partial cutaway to show the secondary plant chopper.

Referring to FIGS. 1 and 3 the first operating configuration is an aquatic plant cutting and harvesting configuration. In this configuration the forward frame end 101 is provided with a cutting bar 2 and a suction hood 4A. A flexible suction hose 6 extends from the apex of suction hood 4A up to the deck of punt 1. On deck the hose extends to the suction end 12 of a suction pump 5. A second flexible pipe 13 extends from the outlet of pump 5 to above a strainer.

Preferably the strainer comprises a collection bag 10. The collection bag 10 is supported from a frame 14 and sits on a sloped platform 120 supported above the side rail level of punt 1. The sloped platform 120 has side and back walls, and a front opening over the side rail of the punt. The collection bag 10 is an open mesh bag allowing free release of entrained water through its walls.

The preferred form of cutting bar and suction hood is illustrated in FIG. 3.

Referring to FIG. 3 the preferred cutting bar 2 includes a first reciprocating bar with cutting knives 122 and a second stationary bar with a guide comb of protruding fingers or prongs 3. The reciprocating bar, carrying knives 122 is preferably driven by a hydraulic motor through an eccentric linkage. Each knife 122 includes a serrated blade on each leading edge. In reciprocating the knife passes into a slot in each adjacent guide prong. Therefor a blade edge of each knife 122 cuts material against an adjacent prong with each movement of the reciprocating bar. The guide prongs 3 extend considerably beyond the leading points of the blades 122. Preferably this forward extension is greater than 50 millimetres and most preferably in the range 50 millimetres to 220 millimetres. This forward extension allows the guide prongs 3 to be used as an underwater rake without the cutter operating. It also acts to disturb fish or fauna sufficiently in advance of the cutter and suction head to allow for their escape. The extended prongs 3 may also pick up plants in advance of the pressure wave generated by forward movement of the suction hood 4A and retain control of the plant, improving cutting performance.

The suction hood 4A has a rectangular receiving opening 11 directly above the cutting bar 2. The cutting bar 2 extends across the width of the bottom edge of the opening 11. The hood includes a pair of side walls, a bottom wall and a top wall generally tapering to an apex 125. Preferably the bottom wall and two side walls are solid sheet metal while the top wall 4A includes mesh filtering panels 126. The mesh filtering panels 126 and forward opening 11 assist the general flow of water within the hood 4A toward the apex 125 with forward movement of the vessel. The hood 4A includes a secondary vegetation chopper 127 adjacent the entrance to flexible hose 6. The chopper 127 is preferably hydraulically driven. The chopper may take the form of a rotatable shaft having a series of tines or blades for cutting plant material presented in the immediate vicinity of the shaft. The shaft spins in a direction to both chop material and throw the material toward the entrance to the suction hose. For example as illustrated in FIG. 3 the shaft spins in an anticlockwise direction as viewed from the drive motor end. In the preferred form the tines extend radially and then axially. The axle position of each tine includes a bevelled edge for carting plant material. The shaft is driven at approximately 450 rpm directly by the hydraulic drive motor. Suction hose 6 connects with a flanged opening 191 in the upper wall of the hood 4A adjacent the apex 125.

Cutting bar 2 and suction hood 4A are preferably the same width as the punt 1, for example 2.4 metres.

The suction hood 4A and cutter bar 2 are connected with the frame 100 at leading pivot points 130 on arms 7. The suction hood 4A is connected to the frame 100. The cutter bar 2 is connected to the frame 100 at leading pivot points 130 on arms 7. The attachment is made using bolt and nut. Orientation of the cutter bar relative to frame 100 is achieved by removal of two bolts on either side of the arms 130 and manually adjusting up or down the cutter bar 2. There are three adjustment points the adjustment is necessary to keep cutter bar 2 approximately horizontal to the plant material when cutting at depth.

The suction hose is preferably sufficiently large in cross section to not significantly impede the flow of large volumes of water with entrained chopped plant material. A flexible hose with 200 millimetre internal diameter has been found appropriate.

The form of pump 5 is not critical to the present invention. It is envisaged that any of a number of available pumping arrangements may be used assuming they meet the criteria: provide sufficient suction to lift material up to the punt level and expel material up to the discharge level and capable of handling fluids with entrained plant matter. For example most pump designs intended for fluid flows including entrained solids (for example sewage sludges, slurries and the like) would be appropriate. One example of a type found effective is a screw centrifugal pump such as a Hidrostal EO8Q-SL, FIOK-HD, F10K-SS, F10K-SD which has appropriate capacity for the present application when driven by a 16 horsepower motor through a reduction gearbox. The first length 6 of flexible hose is connected to a flange 12 on the suction side of the pump body. The outlet hose 13 is connected to the pump outlet flange.

Generally the plant material is further macerated by progress through the screw centrifugal pump before being expelled through the second pipe 13 into the apparatus. The frame 14 of the straining apparatus includes attachment points for holding the collection bag in an open position to receive the fluid from the outlet end of flexible pipe 13. Preferably the collection bag is a cuboid bag 10 with an open top and a support loop 150 connected with each top corner, and the supporting frame 14 has an upstand peg 152 at each upper corner to receive the supporting loops 150. The bag 10 is configured to sit within the side walls 154 and back walls 156 of the supporting trough, on the sloping base 120.

When the collecting bag 10 has reached an appropriately full condition it can be released from the frame 14, tied closed and pushed down the sloping support surface 120 into the water for collection by another vessel. A new collecting bag can then be strung up allowing near continuous operation of the harvesting machine. The collecting bag may be provided with additional flotation if this is considered necessary with the vegetative material being harvested. The collecting bag may include additional devices for securing it in a closed condition, for example a closure flap 10A with heavy duty zipper fastening. Alternative arrangements may also be made for supporting the bag in an open condition without departing from the scope of the present invention. For example the upper edge of the bag may be turned back over a surrounding lip, or the bag may be supported outboard of the vessel. Also, in less preferred embodiments, collection of the harvested plant material can be in an on board perforated hopper, or onto a separate vessel moored alongside or behind the punt 1.

Figure 4:
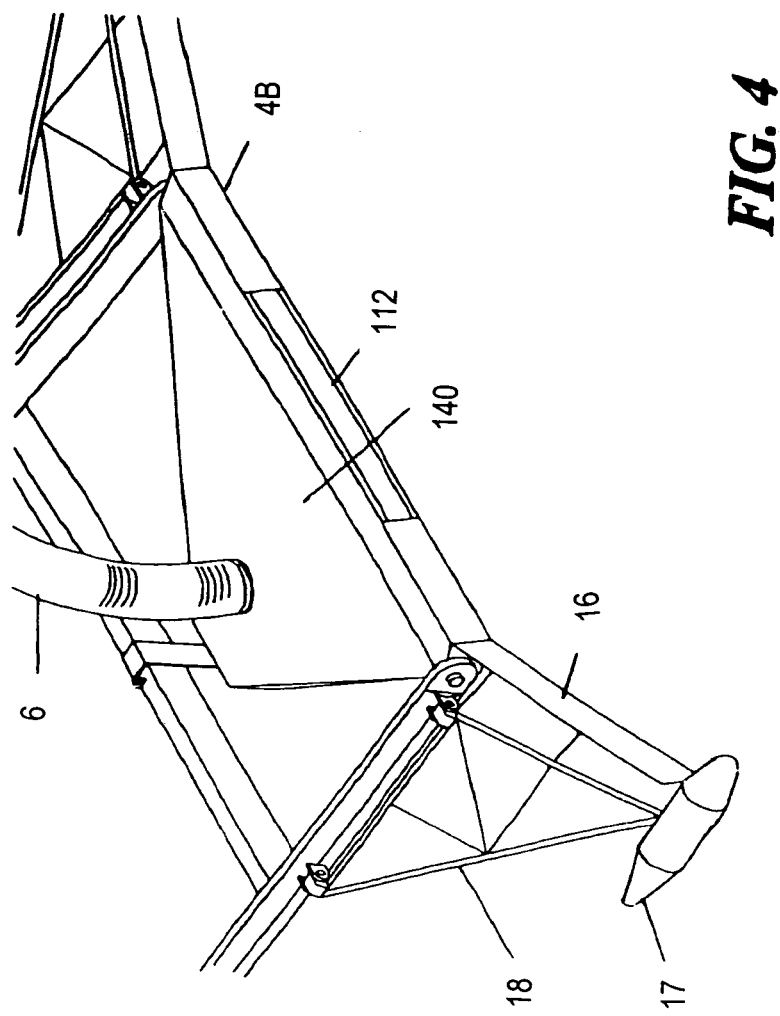
FIG. 4 is a perspective view of the skimming head in use in FIG. 2.

A second operating configuration is illustrated in FIGS. 2 and 4. In this configuration the cutting bar 2 and collection hood 4A are replaced by a suction hood 4B. The suction hood 4B is specifically configured for straining the surface layers of water. The hood 4B includes a leading edge opening 112 and an otherwise fully enclosed main body 140. The hood 4B preferably includes a pair of side arms 16 which extend outward from the lateral edges of the hood 4B and terminate in a pair of guide floats 17. A connecting web 18 extends back from the guide flap 17 to be pin connected with the respective side arm 7. The connection webs 18 brace the side arms 16. The floats 17 help to support the suction hood 4B within the surface layers of the water being cleaned. As with the harvesting configuration, the flexible hose 6 connects to the apex of hood 4B and creates a considerable suction effect through the opening 112 in the leading edge. This allows for the ready removal of floating vegetation, being generally confined to the surface layers of the water being cleaned.

In the further configuration illustrated in FIG. 6 the apparatus of the present invention is configured for cutting vegetation without collection. This configuration may be used either for cutting aquatic vegetation for collection by alternative means, or for cutting land based vegetation, such as sedges, growing on the banks of the aquatic environment. This configuration preferably includes the cutting bar of the harvesting configuration, but not the suction hood. The frame 100 may be elevated above the horizontal so that the cutting bar is fully clear of the water for cutting land based vegetation on the banks of the aquatic area. For the vessel configuration shown land based vegetation can be cut to a height and inland distance of approximately 1.5 metres.

In a still further aspect the invention consists in a control system for the vessel. The vessel includes a GPS guidance system. This guidance system includes a GPS receiver 700 for position tracking, providing its output to an onboard microcomputer 702. The microcomputer includes a memory module 704 and a processing unit 706. The processing unit 704 operates a program stored in the memory unit 706. The processing unit 704 stores positional data received from the GPS receiver 700 in the memory unit 706. A display 708 is operable by the processing unit 704, and a user input device 710 at the steering station 113 allows entry of user data for the processing unit 704. The programs run by the processing unit 704 preferably provide the following functionality:

(a) Allow storage of geographical information concerning the local aquatic environment in the memory unit 706. Preferably this information includes map information with general boundaries, obstacle and depth information and the like, and vegetation specific information, such as the location of plant assemblages.
  (b) Allows for displaying on the display module the geographic information stored in the memory unit.
  (c) Allows for display of movement information for the vessel on the display unit, such as current position, recent path, and pre-plotted course.
  (d) Allows for calculation of cleared areas based on cut width, plotted path and vegetation location, and subsequent display of areas yet to be cleared as highlighted super positions on the map display.

(e) Allows for update of the geographic data, particularly vegetation coverage, following vessel traverse.

Preferably the system includes an upload and download interface 712 for uploading information to and downloading information from the memory unit. The system may also receive data from other onboard devices such as winch controller output 714. This extra data may be used to improve work recordal or to provide warning indications.

Figure 8:
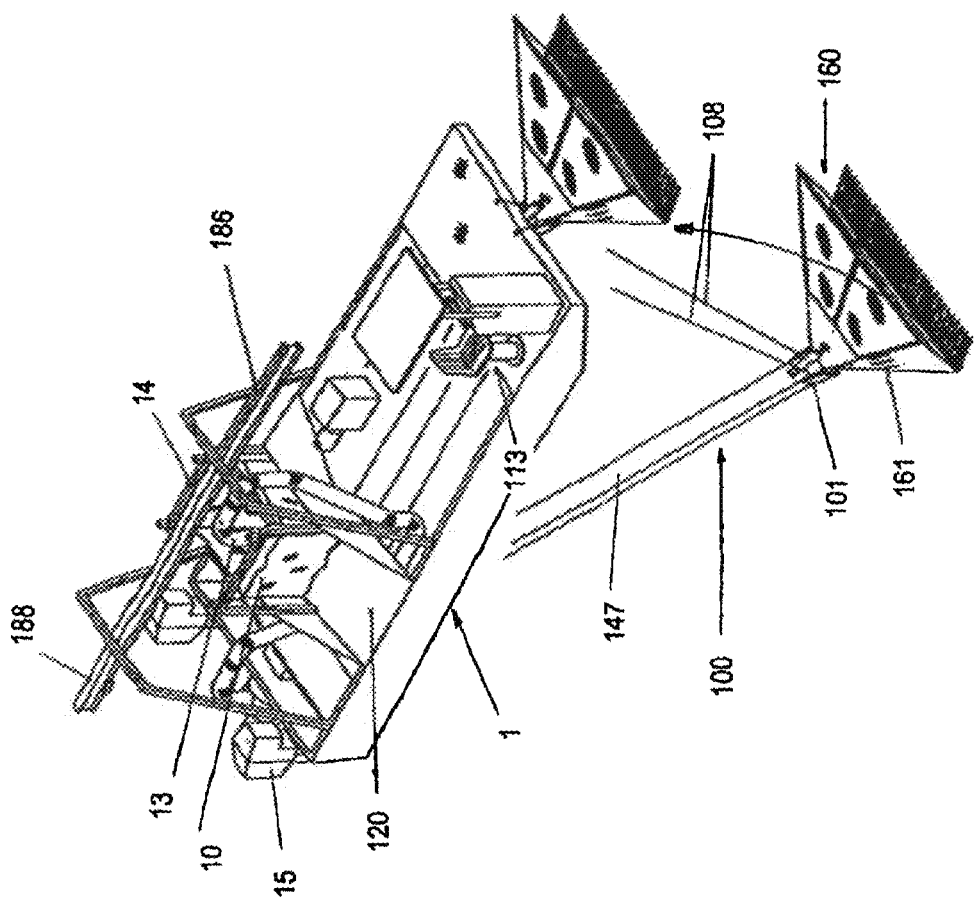
FIG. 8 is a schematic perspective view of a harvester according to another preferred embodiment of the present invention.

Referring to FIG. 8 there is shown a further embodiment of harvester according to the invention. Where appropriate the same reference numerals have been used to identify the same parts of the earlier embodiment.

Figure 9:
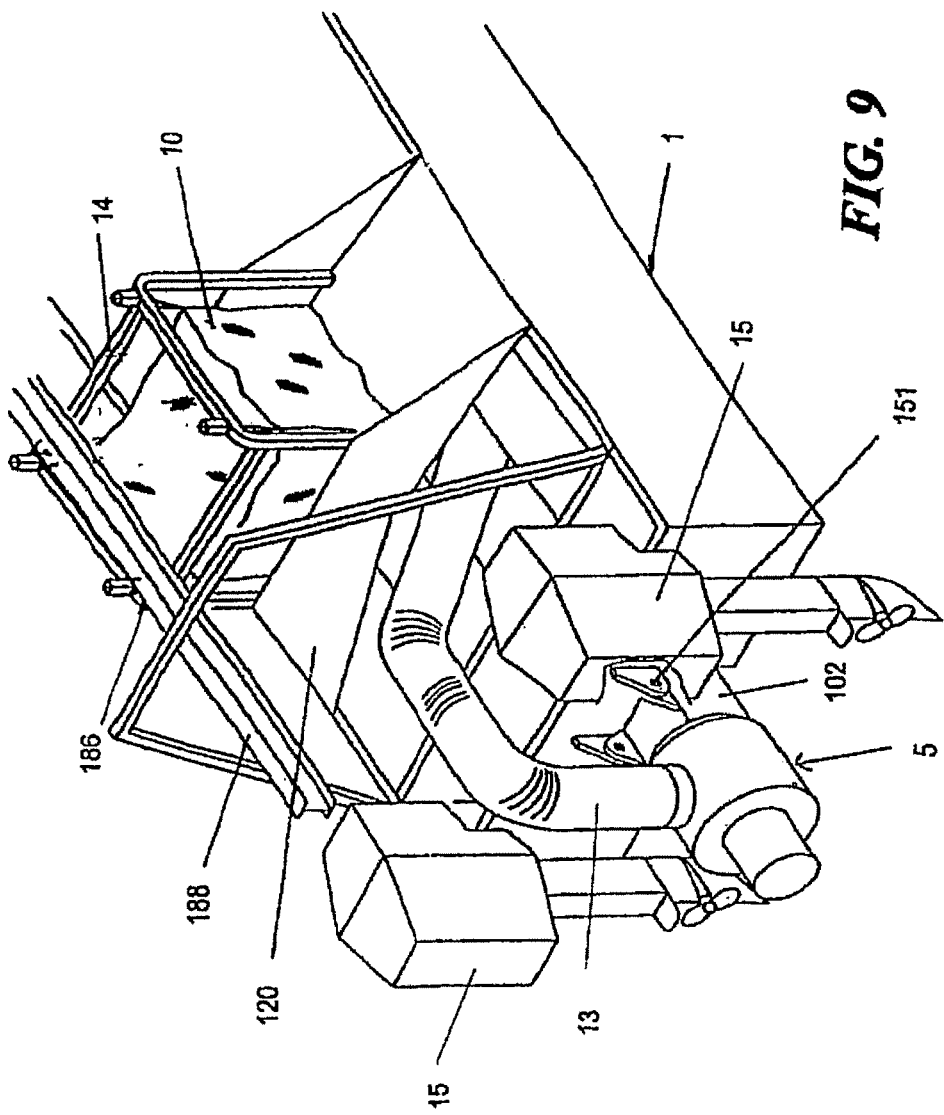
FIG. 9 is a more detail view of part of the harvester shown in FIG. 8.

In this particular embodiment the frame 100 comprises a single arm 147 having a working end or forward end 101 to which an implement or work head 160 can be operatively connected. Arm 147 has a rearward end 102 which is mounted to the punt 1 at the stern via pivot mounting 151 (FIG. 9). Pump 5 is disposed at the rearward end 102. Conduits 171 and 172 are mounted within the arm 147 and operatively connected to the pump 5. Conduit 13 transfers material to the bag 10 as described earlier. Pivotal movement of arm 147 is in the same fashion as described earlier.

Figure 10:
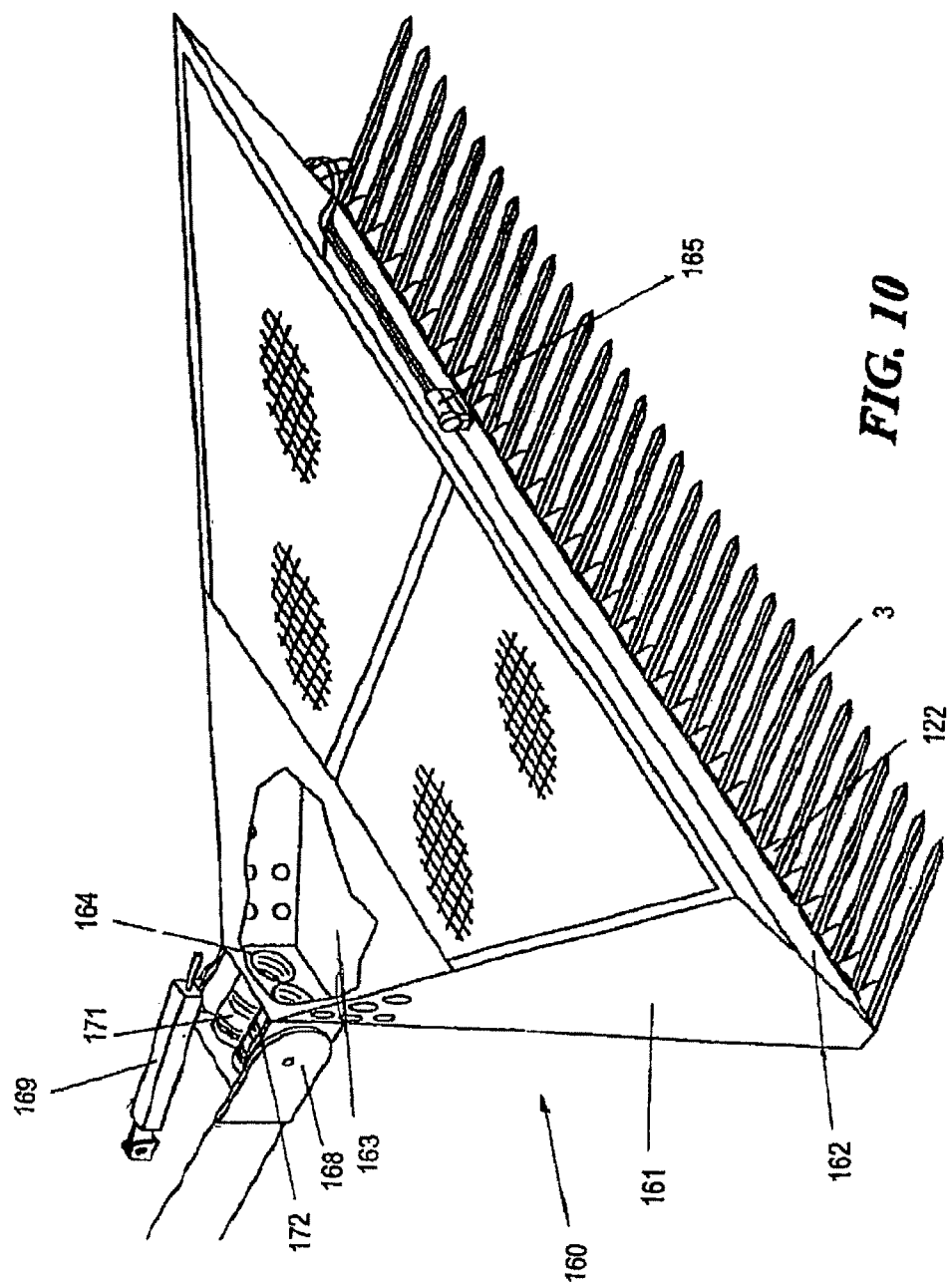
FIG. 10 is a schematic view of a further embodiment of a work head for use with a harvester according to the invention.
Figure 11:
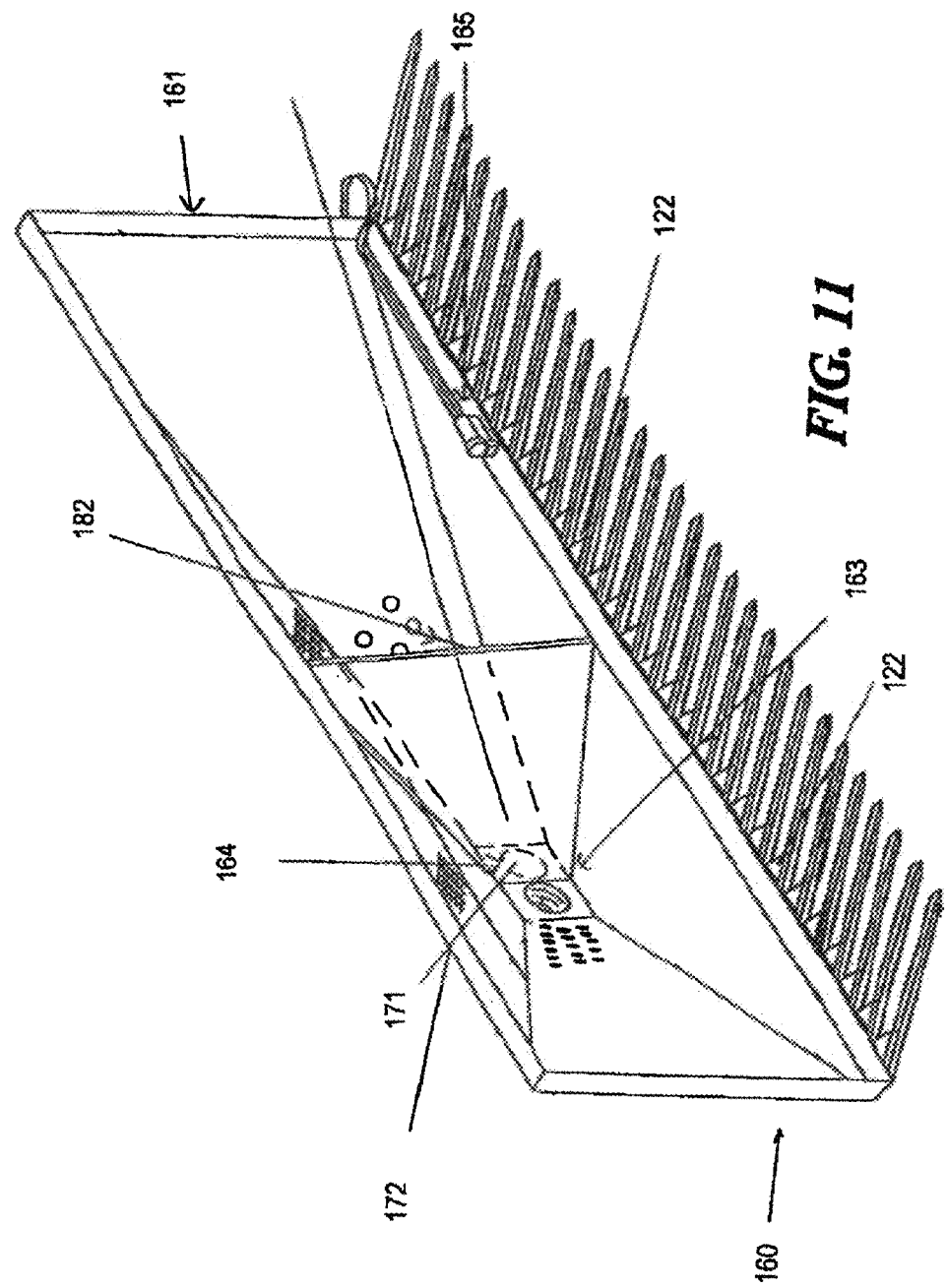
FIG. 11 is a schematic view of a further embodiment of work head according to the invention.
Figure 12:
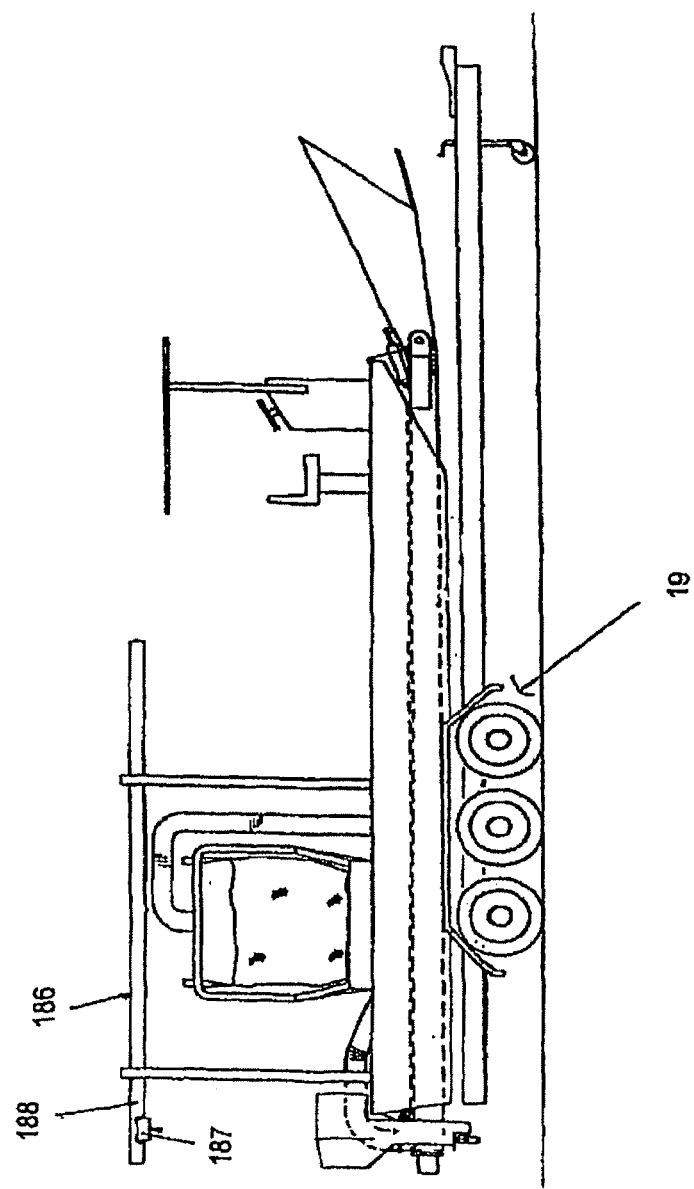
FIG. 12 is a side elevation of the harvester shown in FIG. 1.

The implement or work head 160 shown in FIGS. 10 and 11, a suction hood 161 having an opening 162 leading into an interior chamber 163. An outlet 164 is provided at the rear of the hood 161 which provides communication with transfer conduits 171 and 172 which are disposed within the arm 147 and are operatively connected to suction pump 5. The hood 161 includes cutting knives 122 and prongs 3 forming a guide comb as has been described earlier the cutting knives 122 are driven by hydraulic motor 165. The hood 161 is pivotally mounted to arm 147 via mounting 168 and hydraulic ram 169 enables pivotal movement of the hood relative to the arm.

In the embodiment shown in FIG. 11 the interior of the hood is separated into two zones by partition 182 each zone being associated with a respective conduits 171 and 172.

Figure 13:
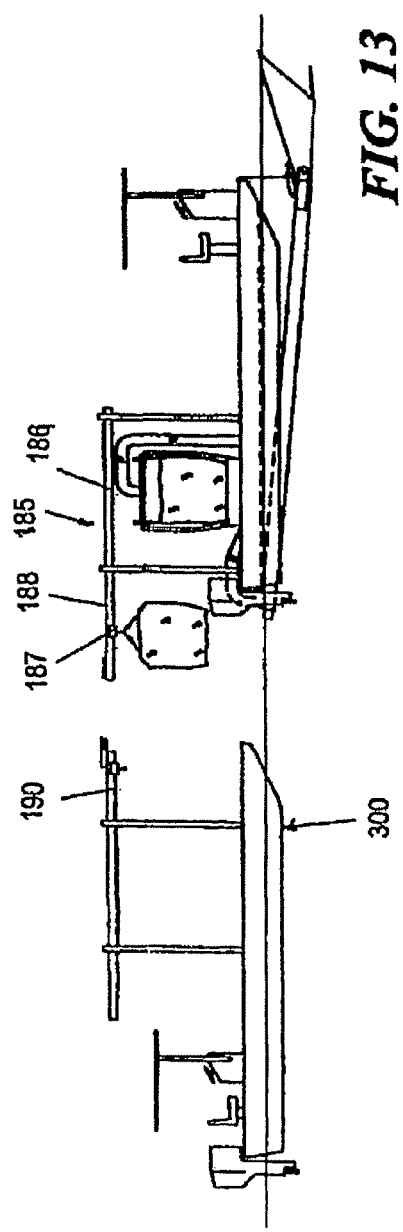
FIGS. 13 and 14 are schematic illustrations of a system for transferring collection bags from the harvester.
Figure 14:
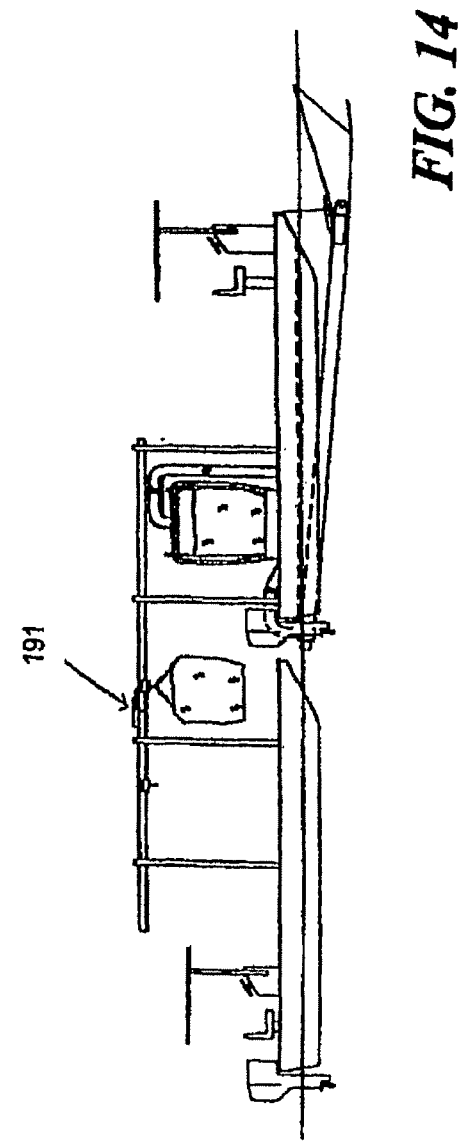

With reference to FIGS. 13 and 14 there is shown a transfer system 185 for transferring bags of collected material to another site. The system 185 includes a rail 186 having a carriage 187 thereon which is adapted to receive filled bags. The rail includes a holding section 188 which is adapted to cooperate with a rail 190 on for example another vessel 300 so that filled bags can be removed. A coupling link 191 connects the two rails when a bag is being transferred.

Advantages

The apparatus of the present invention will cut and harvest retrieve and skim in between rowing and canoe lanes set to international standard lane widths. It will cut to a depth of 4 metres, and is designed to cut retrieve and contain macrophytes and transport the biomass to the surface, contained in a pipe where there is little chance of the material escaping.

The water dynamics of the combined arms, cutter and hood arrangements indicate that a very small pressure wave is created with forward movement of the vessel.

The extended fingers alert fish or other fauna before fish and other fauna enter the cutting zone plus supporting the plant material before being cut if it has become lodged.

The guidance and tracking system avoids missing areas to cut when water becomes turbid.

With a simple hood change the apparatus can surface skim with complete removal dry cut the banks to a height of 1.5 metres above the water line.

The equipment is easily transported and launched.

The apparatus fulfils the International Rowing Body FISA requirements in maintaining the required clear water zone currently set at 3 metres.

The apparatus has low wind resistance due to its compact nature.

The three stage cutting system (initial cut, rotary cut and then maceration in the 15 pump) reduces the bulk of the harvested vegetation which assists in the land based composting process.

The guidance and tracking system allows recorded under water plant assemblages to be relocated in the future or during times of the season when visibility is poor.

The collection and straining system allows for collection of plant material into a unitary container that can be closed and dropped from the vessel as necessary. A large number of the mesh bag containers can be carried on the vessel for continuing use without significant interruption in the aquatic plant harvesting or clearance. The mesh size of the collecting bag may be selected with reference to the vegetation to be cleared to allow optimum water flow, but the large straining surface allows a conservative mesh size to be adopted.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge in Australia.

Finally, it is to be understood that the inventive concept in any of its aspects can be incorporated in many different constructions and various alterations, modifications and/or additions may be incorporated into the various constructions and arrangements of parts without departing from the spirit or ambit of the invention.

We claim:

1. An aquatic harvester for use with an aquatic craft, the aquatic craft including sides, a bow and a stern, the aquatic harvester including a frame which includes one or more arms, each arm having a forward end portion and each arm being pivotally connected to the aquatic craft at a position spaced from the bow, said forward end of each arm being adapted for connection with an implement, the implement including a collection zone for collecting harvested material or articles, the harvester further including a suction pump operatively carried by the aquatic craft in spaced relation from the implement, and a transfer conduit between the suction pump and the implement arranged to transfer collected material or articles from the collection zone of the implement to the aquatic craft, a controller for controlling the pivotal position of each arm relative to the aquatic craft, a strainer assembly on the craft for receiving a flow of water with the harvested material or articles therein from the suction pump and releasing the water and retaining material or articles and a conduit extending from an outlet of said pump to said strainer assembly, the strainer assembly including a straining bag having at least a collapsed form and an open form, and a support for supporting said straining bag, said support including a platform at an elevation above at least a part of one side of the craft, said platform extending towards and over the side of the craft, the platform being enclosed around its perimeter, other than to let water flow over the side of the craft, and said bag being disposed on and above said platform.

2. An aquatic harvester according to claim 1 including a pair of said arms, each arm having rearward ends remote from said forward ends, said rearward ends of said arms being pivotally connected with either side of said craft at a point generally amidships of said bow and said stern and said forward ends of said arms extending beyond the bow of said aquatic craft, when said arms are pivoted to an approximately horizontal condition, and at least one transverse connection between said arms forward of said bow of said aquatic craft with said arms in said horizontal condition.

3. An aquatic harvester according to claim 1 wherein no more than one arm is provided, the arm being disposed generally centrally of the underside of the aquatic craft and extending in a direction between the stern and the bow.

4. An aquatic harvester according to claim 1 wherein said implement includes a collecting hood having said collection zone therein and a mouth opening for receiving harvested material or articles and an outlet opening, the conduit connecting between an inlet to said suction pump and said outlet opening of said collecting hood.

5. An aquatic harvester according to claim 1, wherein the bag includes closure device for closing the opening of said bag, and said device to support the straining bag allows release of the closed bag off said aquatic craft.

6. An aquatic harvester according to claim 1, wherein the collecting hood includes a chopper at or adjacent said outlet opening for chopping plant debris received into said collecting hood into smaller portions, and a cutting head, extending across a bottom edge of said hood over the full width of said hood.

7. An aquatic harvester according to claim 6 further including at least one float attached to said forward end of said frame, said float supporting said forward end of said frame at or adjacent the water surface for allowing surface skimming by said collecting hood.

8. An aquatic harvester according to claim 1, wherein the platform is sloped.

9. An aquatic harvester for use with an aquatic craft, the aquatic craft including sides, a bow and a stern, the aquatic harvester including a frame which includes a no more than one arm disposed generally centrally of the underside of the aquatic craft and extending in a direction between the stern and bow, the arm having a forward end portion and a rearward end portion and being pivotally connected to the aquatic craft at a position in the region of the stern of the aquatic craft, said forward end of the arm being adapted for connection with an implement, the implement including a collection zone for collecting harvested material or articles, the harvester further including a suction pump mounted in spaced relation from the implement, and a transfer conduit between the suction pump and the implement arranged to transfer collected material or articles from the collection zone of the implement to the aquatic craft, a controller for controlling the pivotal position of the arm relative to the aquatic craft, wherein said implement includes a collecting hood having said collection zone therein and a mouth opening for receiving harvester material or articles and an outlet opening, the conduit connecting between an inlet to said suction pump and said outlet opening of said collecting hood, further including a strainer assembly on the craft for receiving a flow of water with the harvested material or articles therein from the suction pump and releasing the water and retaining material or articles and a conduit extending from an outlet of said pump to said strainer assembly, wherein the strainer assembly includes a straining bag having at least a collapsed form and an open form, and a support to support said straining bag in said open form below an outlet to said conduit from said pump outlet.

10. An aquatic harvester according to claim 9, wherein the support includes a platform at an elevation above at least a part of one side of the craft, said platform extending towards and over the side of the craft, the platform being enclosed around its perimeter, other than to let water flow over the side of the craft, and said bag is disposed on and above said platform.

11. An aquatic harvester according to claim 10, wherein the bag includes closure device for closing the opening of said bag, and said device to support the straining bag allows release of the closed bag off said craft.

12. An aquatic harvester for use with an aquatic craft, the aquatic craft including sides, a bow and a stern, the aquatic harvester including a frame which includes no more than one arm disposed generally centrally of the underside of the aquatic craft and extending in a direction between the stern and bow, the arm having a forward end portion and a rearward end portion and being pivotally connected to the aquatic craft at a position in the region of the stern of the aquatic craft, said forward end of the arm being adapted for connection with an implement, the implement including a collection zone for collecting harvested material or articles, the harvester further including a suction pump mounted in spaced relation from the implement, and a transfer conduit between the suction pump and the implement arranged to transfer collected material or articles from the collection zone of the implement to the aquatic craft, and a controller for controlling the pivotal position of the arm relative to the aquatic craft, a strainer assembly on the craft for receiving a flow of water with the harvested material or articles therein from the suction pump and releasing the water and retaining material or articles and a conduit extending from an outlet of said pump to said strainer assembly, the strainer assembly including a straining bag having at least a collapsed form and an open form, and a support for said straining bag which includes a platform at an elevation above at least a part of one side of the craft, said platform extending forward and over the side of the craft, the platform being enclosed around its perimeter, other than to let water flow over the side of the craft, and said bag being disposed on and above said platform.

13. An aquatic harvester for use with an aquatic craft, the aquatic craft including sides, a bow and a stern, the aquatic harvester including a frame which includes no more than one arm, said one arm being disposed generally centrally of the underside of the aquatic craft and extending in a direction between the stern and bow, the arm having a forward end portion and a rearward end portion and being pivotally connected to the aquatic craft at a position in the region of the stern of the aquatic craft, said forward end of the arm being adapted for connection with an implement, the implement including a collection zone for collecting harvested material or articles, the forward end portion configured to extend beyond the bow of the craft when the craft is in a generally horizontal position, the harvester further including a suction pump operatively carried by the aquatic craft and a transfer conduit between the suction pump and the implement arranged to transfer conduit between the suction pump and the implement arranged to transfer collected material or articles from the collection zone of the implement to the aquatic craft, and a controller for controlling the pivotal position of the arm relative to the aquatic craft.

14. An aquatic harvester according to claim 13, wherein the suction pump is operatively mounted to the rearward and end portion of said arm, said pivot connection being between said suction pump and the forward end of the arm.

15. An aquatic harvester according to claim 14, wherein said one arm is a generally tubular member the interior of which defines the transfer conduit.

16. An aquatic harvester according to claim 14, wherein said one arm is a generally tubular member said transfer conduit being disposed within said tubular member.

17. An aquatic harvester according to claim 16, wherein two said transfer conduits are provided each being disposed within said tubular member.

18. An aquatic harvester according to claim 13, wherein said implement includes a collecting hood having said collection zone therein and a mouth opening for receiving harvester material or articles and an outlet opening, the conduit connecting between an inlet to said suction pump and said outlet opening of said collecting hood.

19. An aquatic harvester according to claim 18, further including a strainer assembly on the craft for receiving a flow of water with the harvested material or articles therein from the suction pump and releasing the water and retaining material or articles and a conduit extending from an outlet of said pump to said strainer assembly.

20. An aquatic harvester according to claim 17, wherein the strainer assembly includes a straining bag having at least a collapsed form of an open form, and a support for supporting said straining bag in said open form below an outlet to said conduit from said pump outlet.

21. An aquatic harvester according to claim 20, wherein the support includes a platform at an elevation above at least a part of one side of the craft, said platform extending towards and over the side of the craft, the platform being enclosed around its perimeter, other than to let water flow over the side of the craft, and said bag is supported on said platform.

22. An aquatic harvester according to claim 18, wherein the collecting hood includes a chopper at or adjacent to said outlet opening for chopping plant debris received into said collecting hood into smaller portions, and a cutting head, extending across a bottom edge of said hood over the full width of said hood.

23. An aquatic harvester according to claim 22, further including at least one float attached to said forward end of said frame, said float supporting said forward end of said frame at or adjacent to the water surface for allowing surface skimming by said collecting hood.

* * * * *